United States Patent
Schneider et al.

(10) Patent No.: US 6,832,743 B2
(45) Date of Patent: Dec. 21, 2004

(54) METHOD FOR MANAGING IN-FLIGHT REFUELLING OF A FLEET OF AIRCRAFT

(75) Inventors: Catherine Schneider, Aurade (FR); Dominique Morin, Guyancourt (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 10/479,409

(22) PCT Filed: Jun. 4, 2002

(86) PCT No.: PCT/FR02/01893

§ 371 (c)(1),
(2), (4) Date: Dec. 3, 2003

(87) PCT Pub. No.: WO02/101685

PCT Pub. Date: Dec. 19, 2002

(65) Prior Publication Data

US 2004/0182966 A1 Sep. 23, 2004

(30) Foreign Application Priority Data

Jun. 8, 2001 (FR) .............................. 01 07530

(51) Int. Cl.[7] .............................................. B64D 39/00
(52) U.S. Cl. ................ 244/135 R; 244/1 R; 244/135 A
(58) Field of Search .................... 244/135 R, 135 A, 244/141, 1 R; 89/1.11; 342/23, 456; 701/120, 121; 104/88.01

(56) References Cited

U.S. PATENT DOCUMENTS

| 4,763,861 | A | | 8/1988 | Newman | |
| 5,499,784 | A | * | 3/1996 | Crabere et al. | 244/135 A |
| 5,839,693 | A | * | 11/1998 | Stalaw et al. | 244/114 R |
| 6,644,594 | B1 | * | 11/2003 | Hunn et al. | 244/135 R |

FOREIGN PATENT DOCUMENTS

| DE | 32 02 138 A | 7/1983 |
| WO | 01 02875 A | 1/2001 |

\* cited by examiner

*Primary Examiner*—Peter M. Poon
*Assistant Examiner*—Timothy D. Collins
(74) *Attorney, Agent, or Firm*—Lowe Hauptman Gilman & Berner LLP.

(57) ABSTRACT

The in-flight refueling of a squadron of aircraft by a tanker by means of the same refueling hose requires the formation of a queue and the determination of the number of passes, one or possibly two, by each aircraft to the refueling hose, which constitutes a refueling sequence. Although the order in the queue is simple to establish, since it often corresponds to a classification by decreasing quantities of fuel demanded, the same does not apply to the number of passes to the refueling hose, which must be minimized while still respecting the endurances of the aircraft to be refueled before their actual refueling starts. The method described, which may be implemented by a computer, automates the search for a refueling sequence that satisfies the endurance requirements of the various aircraft to be refueled, while still having the minimum number of passes to the refueling hose by the aircraft in the squadron.

20 Claims, 4 Drawing Sheets

METHOD FOR MANAGING IN-FLIGHT REFUELLING OF A FLEET OF AIRCRAFT

FIELD OF THE INVENTION

The present invention relates to the in-flight refuelling of a squadron of aircraft and more precisely to the determination of the refuelling sequence best suited to the situation of the moment.

BACKGROUND OF THE INVENTION

The current strategic context means that squadrons of aircraft are more and more often required to operate far from their base or for missions of relatively long duration requiring one or more in-flight refuelling operations. In-flight refuelling of a squadron of aircraft requires the organization of a rendezvous between the squadron of aircraft to be refuelled and the tanker and the determination of a refuelling sequence when the aircraft to be refuelled are more numerous than the refuelling hoses that the tanker has at its disposal.

For effective refuelling, an aircraft must approach very closely to the tanker, from the rear, enter its wake to the point of being exposed to its turbulence, grab a refuelling hose and remain attached thereto for the time required to transfer the desired amount of fuel, while continuing to be subjected to the turbulence of the tanker, which makes the flying tricky and means that refuelling taking place may be prematurely interrupted at any instant.

To determine a refuelling sequence, when the aircraft in a squadron have to be refuelled one after the other from the same refuelling hose, poses problems of the order of presentation of the aircraft to the refuelling hose and of the number of passes by each aircraft in the squadron to the refuelling hose in order to have the desired amount of fuel. These problems must be solved so as to optimize, at any instant, the in-flight refuelling operation, that is to say to ensure that the operational capacity of the squadron is maximized if the in-flight refuelling operation has to be prematurely interrupted for any reason and to minimize the number of passes by the aircraft to the refuelling hose, since each pass is an operation both tricky and expensive in terms of operating time.

The optimization, at any instant, of an operation for the in-flight refuelling of a squadron of aircraft, from the same refuelling hose, is accomplished, as a general rule, by organizing a queue ordered according to decreasing needs for fuel. A squadron of aircraft consists in fact, as a general rule, of aircraft of similar characteristics having fuel reserves and consumptions of the same order so that the endurances of the one or more aircraft of which the squadron is composed are, for most of the time, inversely proportional to their fuel demands.

It is preferable to refuel an aircraft in a single pass to the refuelling hose, but this is not always possible as the endurances of the other aircraft in the squadron have to be taken into account. This is because, for better efficiency of the in-flight refuelling of a squadron of aircraft, there is an advantage in providing the point of rendezvous of the squadron of aircraft with the tanker as late as possible, endeavoring to approach, without starting, the fuel reserves of the aircraft to be refuelled, which reserves must allow them, in all circumstances, to reach a rerouting airfield under acceptable safety conditions. However, it may happen, depending on the operational conditions, that the in-flight refuelling rendezvous is later than planned and that some of the aircraft in the squadron can no longer wait, in order to be refuelled, for the time needed for refuelling, in a single pass, the one or more aircraft that precede them in the refuelling queue. There are therefore two solutions, namely either to reroute the aircraft that can no longer wait to a rerouting airfield without effecting their in-flight refuelling, but the squadron is disorganized and its mission often compromised, or to shorten the refuelling of the aircraft preceding an aircraft that cannot wait its turn in order to try to be able to be refuelled in time before starting its fuel reserve. Provided that the one or more aircraft whose refuelling has been shortened have received a sufficient amount of fuel in order to allow them to wait, their refuelling may be completed by a further pass to the refuelling hose by being moved to the end of the queue.

For an in-flight refuelling of a squadron of aircraft from the same refuelling hose of a tanker, it is therefore necessary to provide, in addition to the point of rendezvous with the tanker, the order of the aircraft to be refuelled in the refuelling queue, the number of passes by the aircraft to the refuelling hose, preferably one but possibly two passes, and the amounts of fuel delivered at the various passes. This leads to a large number of possibilities for the in-flight refuelling of a squadron, most particularly when it contains three or four aircraft.

Currently, the organization of the in-flight refuelling of a squadron of aircraft is the responsibility of a refuelling controller on board the tanker, who decides the execution of a refuelling operation, the order of the aircraft to be refuelled in the refuelling queue, the number of passes to the refuelling hose and the amounts of fuel delivered at each pass, depending on the desiderata of the squadron leader and his personal experience. He has the greatest difficulty in finding the most optimum solution for continuing the squadron's mission, each time that the deadlines are stretched relative to the fuel reserves of one or more aircraft in the squadron. In addition, this results, for a refuelled pilot and also for the squadron leader, in the need to take on, during a refuelling phase, a monitoring and planning task in addition to an already tricky flying operation.

It is therefore important to facilitate the organization of the in-flight refuelling of a squadron of aircraft whether this is on a mission over an area or is conveying.

SUMMARY OF THE INVENTION

The subject of the present invention is a method of managing the in-flight refuelling of a squadron of aircraft which can be automated, that is to say is capable of being operated by a computer, and which makes it possible to propose an optimum refuelling sequence, if one exists, that minimizes the number of passes, that is to say the number of operations to catch hold of the refuelling hose of the tanker, both from the overall standpoint of the squadron and from the standpoint of each of the aircraft of which it is composed, while providing the aircraft in the squadron, at the end of the refuelling operation, with the amounts of fuel required, on the basis of knowing the refuelling rendezvous point, the number of aircraft in the squadron, the amounts of fuel desired by the aircraft in the squadron at the end of refuelling, and the distances, from the refuelling rendezvous point, along the route followed by the tanker, of the limiting points that can be reached by the various aircraft in the squadron without refuelling and without them drawing on their fuel reserves.

The subject of the invention is also a method of management of the aforementioned type, making it possible to generate a refuelling sequence such that, during its execution, the operational capacity of the squadron is at the highest possible level throughout the refuelling operations.

The subject of the invention is a method of managing the in-flight refuelling of a squadron of n aircraft A1, ..., An from the same refuelling hose of a tanker, making it possible to generate a refuelling sequence on the basis of taking into account a refuelling rendezvous point P, the number n of aircraft in the squadron, the amounts of fuel Q1, ..., Qn demanded by the aircraft A1, ..., An in the squadron at the end of refuelling and the maximum distances L1, ..., Ln that can be covered by each aircraft in the squadron in waiting for the start of refuelling, these maximum distances L1, ..., Ln corresponding to the distances separating the refuelling rendezvous point P, over the route followed by the tanker, from the limiting points that can be reached by the various aircraft in the squadron without refuelling and without them drawing on their fuel reserves. This method is noteworthy in that it comprises the following steps:

of initially taking an arbitrary refuelling sequence defined by the queuing of the aircraft in the squadron in an arbitrary order A1, ..., An and a single pass by each aircraft in the squadron to the refuelling hose;

of testing the viability of the refuelling sequence adopted, consisting in expressing, as distances D1, ..., Dn to be flown by the tanker, the times needed to deliver to the aircraft in the squadron the planned amounts of fuel during their passes to the refuelling hose and in verifying, by going down the queue, that each aircraft An, ..., A1 will start its refuelling within the deadlines, that is to say before the tanker has flown a distance greater than the maximum distance Ln, ..., L1 that can be covered by the aircraft in question;

when there is no finding that an aircraft will start its refuelling beyond the deadline, of accepting the viability of the refuelling sequence tested and of adopting it;

when there is a finding that an aircraft will start its refuelling beyond the deadline, of modifying the refuelling sequence tested in order to shorten the waiting time by this aircraft and of trying to fuel it within the deadlines, the modification in the sequence consisting in dividing, into two passes, the refuelling operation or operations of one or more aircraft that precede the aircraft in question in the queue, a first shortened pass to the refuelling hose allowing an aircraft to receive a minimum amount of fuel, increasing its endurance sufficiently for it to be able to move to the end of the queue and to wait for a second pass to the refuelling hose without drawing on its fuel reserve, the aircraft whose refuelling is divided into two being chosen so as to minimize the number of passes to the refuelling hose, the choice firstly depending on the aircraft, if there is one, that is placed ahead in the queue and the dividing of the refuelling of which into two passes to the refuelling hose makes it possible to approach as best as possible, by an upper value, the desired time saving, and then on the two aircraft, if they exist, placed ahead in the queue, the divisions of the refuelling of which make it possible to approach as best as possible, by an upper value, the desired time saving, and so on, the absence of a solution in the choice of the aircraft for divided refuelling resulting in a finding that it is impossible to refuel the entire squadron, whereas the presence of a solution leads to a modified refuelling sequence proposal; and of taking any modified refuelling sequence proposal and testing its viability by restarting at the second step of the method.

Advantageously, should the viability test of the arbitrary refuelling sequence initially adopted be negative, this sequence is replaced with a refuelling sequence referred to as a nominal refuelling sequence defined by putting the aircraft in the squadron into a queue in an order corresponding to decreasing amounts of fuel demanded and by a single pass of each aircraft in the squadron to the refuelling hose, the first aircraft in the queue being that requiring the largest amount of fuel.

Advantageously, should the viability test of the arbitrary refuelling sequence initially adopted be negative, this sequence is replaced with a refuelling sequence defined by putting the aircraft in the squadron in a queue in an order corresponding to increasing maximum distances L1, L2, ..., Ln that can be covered, the first aircraft in the squadron being the one that is able to cover the shortest maximum distance.

Advantageously, should a viability test of a refuelling sequence be negative owing to the finding that one aircraft in the squadron will start its refuelling beyond the deadline, the choice of the one or more aircraft, placed ahead in the queue, the refuelling of which is divided, results from systematic virtual tests carried out by going up the queue taking into consideration one aircraft, then two aircraft, including that one giving the greatest time saving, then three aircraft, including the two providing the greatest time saving, and so on.

Advantageously, the duration of the first shortened pass to the refuelling hose of a divided refuelling operation is set to the same value DMIN for all the aircraft in the squadron, which duration is progressively increased, once the refuelling sequence in question has satisfied the viability test, until reaching the endurance limit for one of the aircraft in the squadron.

Advantageously, the choice of the aircraft in the squadron whose refuelling is divided results from checking that a succession of inequality relationships between the flight distances D1, ..., Dn needed by the tanker, in order to deliver the required amounts of fuel during each pass of the aircraft in the squadron to the refuelling hose and the maximum distances that can be covered by each aircraft in the squadron, is met.

BRIEF DESCRIPTION OF THE DRAWINGS

Other features and advantages of the invention will become apparent from the description below of an embodiment given by way of example. This description will refer to the drawing, in which.

DETAILED DESCRIPTION OF THE EMBODIMENTS

Figure 1:
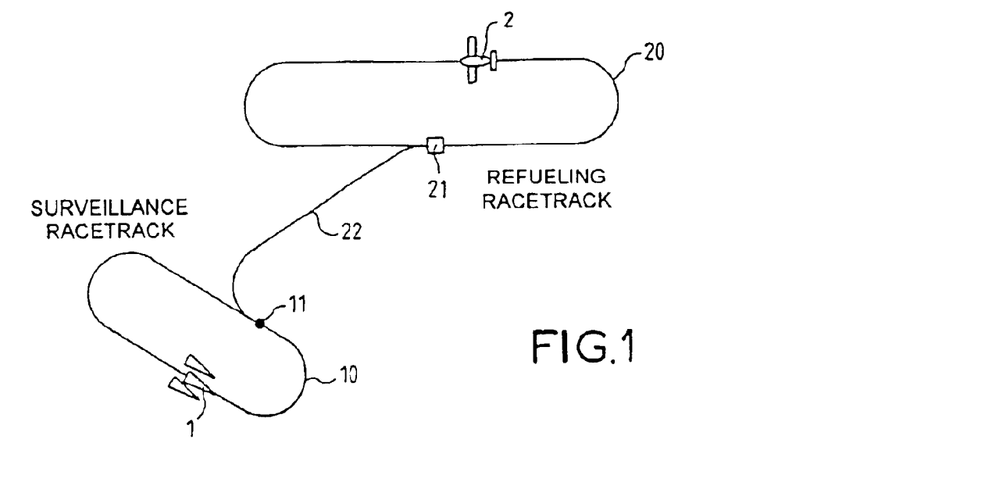
FIG. 1 is a diagram illustrating the operational conditions of a refuelling sequence for a squadron of aircraft on a surveillance mission.

During a distant surveillance mission requiring one or more in-flight refuelling operations, a squadron 1 of aircraft follows, over the surveyed zone, a flight path 10 that has been defined beforehand in terms of time and place during the mission preparation. This flight path, which is often looped, is shown in FIG. 1 by what is referred to as a surveillance racetrack 10. The squadron 1 of aircraft is refuelled by a tanker 2 traveling in a safe zone as close as possible to the surveillance zone.

During refuelling, the aircraft in the squadron 1 must maneuver in order to grab a refuelling hose trailed by the tanker 2 and remain attached thereto for the time required to transfer the fuel. Since these maneuvers are tricky, they are carried out while the aircraft are flying in a straight line. To do this, when the tanker 2 describes a looped flight path, for the purpose of remaining in a safety zone close to the surveillance zone, it often describes a flattened loop 20 having two straight branches, one outward and one inward, propitious to the refuelling operations. This flattened loop 20 is also shown in the form of a racetrack.

Since the positions both in time and in place of the squadron 1 of aircraft over the surveillance racetrack 10 and that of the tanker 2 over the refuelling racetrack 20 have been planned during preparation of the mission, it is necessary to optimize the point 11 and the moment when the squadron 1 of aircraft leaves the surveillance racetrack 10, heading for the tanker 2 so that the aircraft in the squadron 1 can remain for a maximum length of time over the surveillance zone. This optimization can be accomplished either depending on the time, agreed during the mission preparation or during the mission, for rendezvous with the tanker 2, or depending on the endurances of the aircraft in the squadron 1 which determine the limiting point beyond which the squadron 1 must stop its surveillance mission in order to be refuelled. The optimization involves, apart from determining the point 11 and the moment when the squadron 1 of aircraft starts to head for the tanker 2, the determination of a point 21 and of a moment of rendezvous with the tanker 2 along the refuelling racetrack 20, of a joining flight path 22, of airfields for rerouting and of limiting points and flight paths for rerouting each aircraft in the squadron taking into account its endurance before refuelling.

Figure 2:
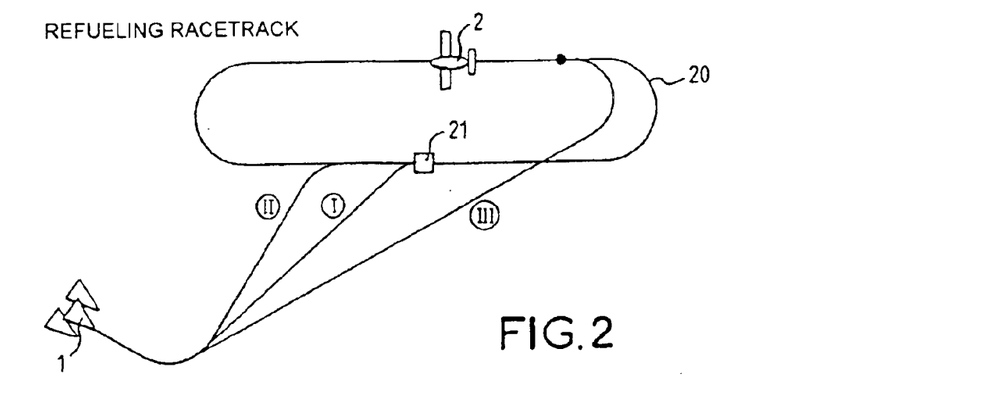
FIG. 2 is a diagram showing the various possible ways of the tanker joining up with the squadron of aircraft to be refuelled depending on the rendezvous point being met.

From the practical standpoint, there may be a time difference over the actual rendezvous due either to the tanker or to the squadron of aircraft to be refuelled so that the rendezvous may take place ahead of time, as shown at II in FIG. 2, or delayed in time, as shown at III in FIG. 2, which means that the point and the moment of the rendezvous, the joining flight path, the airfields for rerouting and the limiting points and flight paths for rerouting the various aircraft in the squadron have to be periodically updated.

Figure 3:
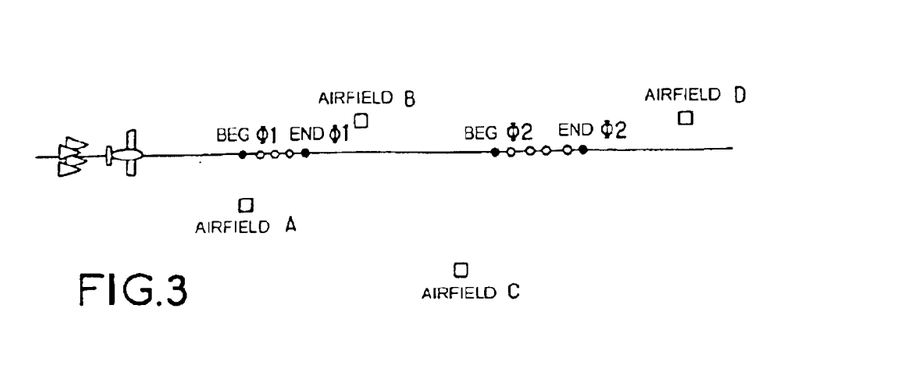
FIG. 3 is a diagram illustrating the execution of a refuelling operation along an axis (for example the case of a conveying flight)

When refuelling the squadron 1 of aircraft with a single refuelling hose, the aircraft in the squadron 1 must form a queue for grabbing, each in turn, the refuelling hose. FIG. 3 shows the execution of a refuelling procedure during which the tanker 2 and the squadron 1 of aircraft fly in line, a first aircraft in the squadron being attached to the refuelling hose over a time from BEGΦ 1 to ENDΦ 1, then a second aircraft in the squadron over a time from BEGΦ 2 to ENDΦ 2, and so on, the convoy formed by the squadron 1 of aircraft and the tanker 2 passing near various airfields for rerouting, namely an airfield A, an airfield B, an airfield C, an airfield D, etc.

In order for an in-flight refuelling sequence for a squadron 1 of aircraft to be viable, that is to say acceptable from the standpoint of safety of the aircraft to be refuelled, it is necessary for a sequence to respect the fuel endurance constraints of the aircraft in the squadron 1 to be refuelled, that is to say that the aircraft to be refuelled will all start their refuelling before drawing on their fuel reserves intended for always keeping them within range of an airfield to which they can be rerouted should there be a problem.

That the fuel endurance constraints of the aircraft to be refuelled are met by an in-flight refuelling sequence may be verified as soon as the point and the moment of rendezvous with the tanker are known with sufficient accuracy. This is because it is then possible:

to provide the amounts of fuel that will still be available to each of the aircraft in the squadron 1 when they reach the point of rendezvous with the tanker 2 on the basis of knowing their actual reserves, their consumptions and the flight path that they have yet to follow up to the rendezvous point and to deduce therefrom the maximum lengths of the flight paths that they will be capable of flying in company with the tanker 2 before drawing on their fuel reserves;

to provide the refuelling wait times for each aircraft in the squadron from the beginning of the rendezvous on the basis of knowledge of the order of the aircraft in the refuelling queue and of their times to pass to the refuelling hose, these being expressed by taking into account the durations of the maneuvers for attaching to and detaching from the refuelling hose and the durations for transferring the required amounts of fuel;

to translate the estimated refuelling wait times into distances flown; and to verify that the refuelling wait times that the aircraft in the squadron 1 will have to suffer, expressed as distances flown, are less than the maximum lengths that they are capable of flying.

Figure 4:
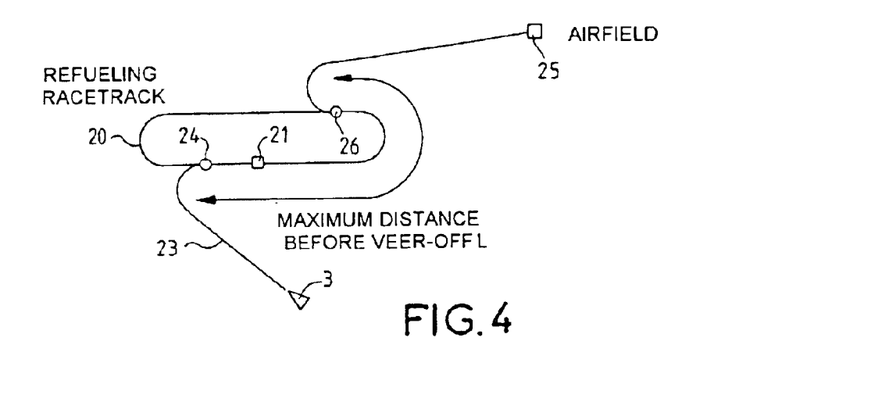
FIG. 4 is a diagram illustrating the problem posed by the limit of endurance of an aircraft to be refuelled.

FIG. 4 illustrates the problem posed by meeting the fuel endurance constraint of an aircraft to be refuelled. The aircraft 3 to be refuelled follows a flight path 23 for joining up with the tanker waiting over the refuelling racetrack 20 for a rendezvous 24 slightly in advance of the planned rendezvous 21. In its current position, it has available an actual fuel reserve which makes it possible to estimate, on the basis of knowing its consumption and the flight path followed, the amount of fuel that it will still have available upon its arrival at the actual rendezvous point 24. Once it has reached the rendezvous point 24, it will fly in convoy with the tanker along the refuelling racetrack until the in-flight refuelling operation has been completed for the entire squadron of which it forms part. During the first part of the convoy flight, in which the aircraft to be refuelled is waiting for the start of refuelling, its fuel reserve must not drop below a safety volume corresponding to that needed to reach an airfield for rerouting, in this case the airfield 25. There is therefore a maximum distance that the aircraft 3 can fly during its convoy flight with the tanker, while waiting to be refuelled. It is possible to estimate the limiting point 26, called the bingo point, that the aircraft 3 can reach along the refuelling racetrack 20 without being refuelled or starting its fuel reserve, since its actual fuel reserve is known, as is the flight path that it will travel, the way in which this will be done and the position of the airfield(s) 25 for rerouting. The distance separating this bingo point 25 along the refuelling racetrack 20 from the actual point of rendezvous 24 with the tanker is the maximum distance L that the aircraft 3 can fly in convoy with the tanker while it is waiting to be refuelled. The time to fly this distance corresponds to the maximum time that the aircraft 3 to be refuelled is allowed to wait.

The viability of a refuelling sequence for a squadron of aircraft is an important property, since its absence means that the formation of the squadron of aircraft is broken and often the continuation of the mission is abandoned. It is therefore to be verified before an in-flight refuelling sequence proposal is adopted. It is also necessary for the proposed in-flight refuelling sequence to be optimal, that is to say it minimizes the number of passes to the refuelling hose, the attachment maneuvers being tricky operations, and maintains the operational capacity of the squadron at its maximum level during its execution.

To minimize the number of passes to the refuelling hose, it is sought to refuel the aircraft in the squadron in a single pass to the refuelling hose, except for when lack of endurance of one or more aircraft makes it impossible for them to wait, in which case up to two passes to the refuelling hose per aircraft to be refuelled are allowed.

To maintain the operational capacity of the squadron of aircraft to be refuelled at its maximum level, the in-flight refuelling sequence is sought which corresponds as far as possible to the delivery of decreasing amounts of fuel during the successive passes of the aircraft to be refuelled to the refuelling hose, the passes to the refuelling hose being more efficient the greater the amount of fuel transferred.

The optimization of an in-flight refuelling sequence for a squadron of aircraft consists in determining an optimum order of the queue in which the aircraft must present themselves to the refuelling hose, assuming that each of them makes at most two passes, the second pass taking place after all the first passes, by rejoining the end of the queue, then in determining the durations of the passes by ensuring that second passes are eliminated as far as possible, while respecting the constraints on the waiting times imposed by the endurances of the aircraft to be refuelled.

Let n be the number of aircraft in the squadron, $1, 2, \ldots, n$ the order adopted for the queue to the refuelling hose, which is preferably the order by decreasing amounts of fuel to be transferred since a squadron often consists of aircraft having very similar levels of consumption and since the aircraft having the least endurance are those requiring the most fuel, $D11+D12$ the distance flown by the tanker over the time to transfer, in two passes, the amount of fuel required by the first aircraft in the queue, $D21+D22$ the distance flown by the tanker over the time to transfer, in two passes, the amount of fuel required by the second aircraft in the queue, and so on, $Dn1+Dn2$ being the distance flown by the tanker over the time to transfer, in two passes, the amount of fuel required by the last aircraft in the queue, and $L1, L2, \ldots, Ln$ the distances separating the various bingo points of the aircraft in the squadron from the rendezvous point, the compliance with the fuel constraints of the aircraft in the squadron being expressed by the condition:

$$L(i+1) \geq \sum_{j=1}^{i} Dj1.$$

Minimizing the number of passes to the refuelling hose amounts to eliminating second passes as far as possible, while ensuring that the above condition is complied with.

Optimizing the, refuelling sequence means fixing a minimum duration DMIN for a first pass sufficient for transferring an amount of fuel that increases the endurance of the refuelled aircraft enough for it to be able to move to the end of the queue and wait for its refuelling to be completed without starting its fuel reserve, and then increasing the durations of the first passes up to the maximum levels made possible by the waiting capacities of the aircraft placed behind in the queue.

Proposed below is a method of managing the in-flight refuelling of a squadron of aircraft making it possible to determine an optimum refuelling sequence taking into account the endurances of the aircraft in a squadron, being based on the point of rendezvous of the squadron of aircraft with the tanker, the amounts of fuel required, the distances separating the various bingo points of the aircraft to be refuelled from the rendezvous point, and a minimum duration for a pass to the refuelling hose.

During a first step, an arbitrary fueling sequence is taken, this being based on putting the aircraft in the squadron in a queue in an order $A1, A2, \ldots, An$ proposed, for example, by the squadron leader, and on a single pass of each aircraft in the squadron to the refuelling hose, these single passes requiring flight distances $D1, D2, \ldots Dn$, and measures are taken to ensure the viability of this arbitrary refuelling sequence, that is to say the compliance with the endurances of the aircraft in the squadron, by verification of all of the conditions:

$$\sum_{i=1}^{j} Di < L(j+1) \text{ with } 1 \leq j \leq n-1 \qquad (1)$$

If these conditions are met in their entirety, the arbitrary refuelling sequence is possible and the method of managing the refuelling may stop.

If one of the above conditions is not met, the arbitrary refuelling sequence is rejected, as it poses an endurance problem for at least one of the aircraft in the squadron.

Should the arbitrary refuelling sequence be rejected, the method continues with the actual determination of an optimum refuelling sequence. This consists, when it is found that an aircraft will start its refuelling after the time allowed by its endurance, in modifying the tested refuelling sequence in order to shorten the time that this aircraft has to wait and ensure that it is refuelled within the deadlines. This modification consists in dividing a refuelling operation or operations into two passes for one or more aircraft that precede the aircraft in question in the queue, a first shortened pass to the refuelling hose allowing an aircraft to receive a minimum amount of fuel that increases its endurance sufficiently for it to be able to move to the end of the queue and wait for a second pass to the refuelling hose without drawing on its fuel reserve.

This or these divisions must be effective, that is to say must achieve the desired aim of refuelling, within the deadlines, the aircraft that poses an endurance problem, while imposing a minimum of maneuvering and maintaining the operational capacity of the squadron at the maximum level throughout the refuelling. The number of aircraft whose refuelling is divided into two must be a minimum and the amounts of fuel delivered during the first passes must be maximized.

To minimize the number of passes to the refuelling hose, the aircraft posing an endurance problem are treated in the order of the queue. For each aircraft identified as posing an endurance problem, it is determined whether one or more refuelling divisions for aircraft placed ahead in the queue would allow this problem to be avoided. The choice of dividing the refuelling depends firstly on the aircraft, if there is one, which is placed in the queue ahead of the aircraft posing an endurance problem, and the dividing of the refuelling of which into two passes to the refuelling hose makes it possible to approach a far as possible, by an upper value, the desired time saving, then, if none allows the expected time saving, on two aircraft, if they exist, placed in the queue ahead of the aircraft posing an endurance problem, the divisions of the refuelling of which make it possible to approach as far as possible, by an upper value, the desired time saving, and so on, a lack of a solution in the choice of the aircraft for divided refuelling resulting in a finding that it is impossible to refuel the entire squadron, whereas the presence of a solution results in a modified refuelling sequence proposal whose viability is tested before being accepted.

When the proposed arbitrary refuelling sequence initially proves to be non viable, before envisaging one or more divisions into two passes of the refuelling of the aircraft in the squadron, it is profitable to replace it with what is called a nominal refuelling sequence, still based on a single pass per aircraft to be refuelled, but with a queue order corresponding to decreasing amounts of fuel transferred, the first one served being at having presented the greatest demand, the second a lesser demand and so on until the last one. This nominal refuelling sequence has in fact a better chance of allowing the squadron to be maintained at the maximum of its operational capacity during the refuelling operation in so far as it consists of aircraft of similar performance. This sequence corresponds to distances $D1, D2, \ldots, Dn$ needed for one-pass refuelling of the aircraft in the squadron forming a decreasing sequence:

$$D1 \geq D2 \geq \ldots \geq Dn.$$

If it is different from the initial refuelling sequence, the nominal refuelling sequence is in turn tested as regards its viability. If it proves to be viable, all the conditions (1) being fulfilled, it is adopted and the process of determining the refuelling sequence is stopped. If it proves not to be viable, one or more aircraft in the squadron having endurance problems foreseen during the refuelling operation, it is still possible to envisage, as a safeguard, a third refuelling sequence still based on a single pass per aircraft to be refuelled, but with an order in the queue corresponding to maximum distances $L1, L2 \ldots, Ln$ that can be covered by the various aircraft in the squadron during refuelling, forming an increasing series:

$$L1 \leq L2 \leq \ldots \leq Ln.$$

This third refuelling sequence based only on a single pass per aircraft to be refuelled is envisaged as a safeguard, as it normally corresponds to the nominal refuelling sequence. If it is different from the nominal refuelling sequence, its viability is tested. If it proves to be viable, the process of determining the refuelling sequence is stopped.

When the above refuelling sequences based on a single pass per aircraft to be refuelled have all proved to be nonviable, it is endeavored to make the nominal refuelling sequence viable by dividing the refuelling of one or more aircraft in the squadron into two passes.

Before envisaging dividing the refuelling, a check is made whether there is a chance of solving the endurance problem (s) that arise by testing if the aircraft to be refuelled, placed in a queue, in the adopted order, can wait, in order to be refuelled, for the end of the first passes by the aircraft that precede them, accepting that these first passes will take a minimum time corresponding to a minimum distance flown DMIN for each first pass to the refuelling hose, which amounts to checking that the following conditions are satisfied:

$$i \times DMIN \leq L(i+1) \text{ with } 1 \leq i \leq n-1 \quad (2)$$

the minimum distance DMIN being chosen according to the operational conditions so as to transfer a minimum amount of fuel which both makes good use of a pass to the refuelling hose and allows the refuelled aircraft to move to the end of the queue and wait for a second pass to the refuelling hose without having any endurance problem.

If the conditions (2) are not satisfied, the problem is considered as unsolvable.

When the conditions (2) are satisfied, a procedure is carried out according to the number of aircraft forming the squadron to be refuelled.

Two-Aircraft Squadron Case

The aircraft that has an endurance problem during refuelling is necessarily the second one. The solution therefore consists in dividing the refuelling of the first aircraft into two passes, corresponding to flight distances D11, D12, while refuelling the second aircraft in a single pass, corresponding to a flight distance D2 lying between the flight distances D11 and D12 that are dedicated to the refuelling of the first aircraft.

During refuelling, the flight in formation of the tanker and of the squadron consists of the succession D11, D2, D12. To maintain the squadron at its maximum operational capacity, the first pass to the refuelling hose by the first aircraft in the squadron is extended to the maximum allowed by the endurance of the second aircraft in the squadron. Instead of being reduced to the minimum flight distance DMIN, its flight distance is extended in order to reach the maximum flight distance L2 permitted by the endurance of the second aircraft.

The refuelling sequence adopted is then defined by the flight:

D11, D2, D12 with:

D11=L2 and D12=D1−D11 ignoring the second term of the additional distances required by the second maneuver for catching on to the refuelling hose.

Figure 5:
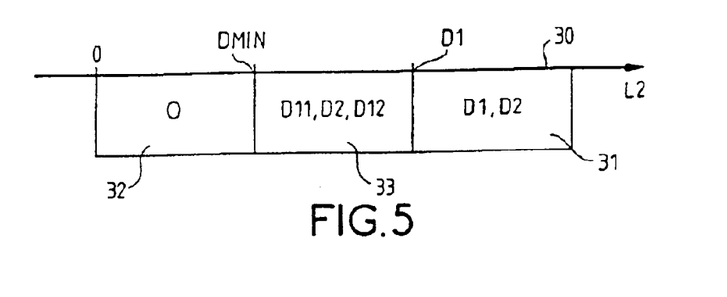
FIG. 5 is a table summarizing the various refuelling sequences proposed according to the various endurance problems that may arise within the context of a squadron of two aircraft.

FIG. 5 is a graphic illustrating the various cases that may arise during in-flight refuelling, with the same refuelling hose, of a squadron of two aircraft, for a given refuelling order 1, 2, with the amounts of fuel demanded by each of the two aircraft in the squadron and the minimum amount of fuel that can be transferred during a pass to the refuelling hose, these being estimated in terms of the flight distances D1, D2, DMIN needed by the tanker for their transfers, and the endurance of the second aircraft in the squadron, estimated in terms of the maximum distance L2 that can be covered.

The graphic in FIG. 5 shows a distance-graduated axis 30 with as variable the maximum distance value L2 that can be covered by the second aircraft in the squadron during the refuelling operation, starting from an origin O coinciding with the actual point of rendezvous of the squadron with the tanker. Along this distance-graduated axis 30 are indicated the minimum distance DMIN flown by the tanker during a first pass of a refuelling operation, which comprises two of them, and the distance D1 that the tanker must fly in order to transfer, to the first aircraft, the entire amount of fuel that it demands in a single pass.

When the maximum distance L2 that the second aircraft can fly while waiting to be refuelled is greater than the distance needed by the tanker to entirely refuel the first aircraft, it is unnecessary to divide the refuelling of the first aircraft. The situation is as in case 31. In this situation, the refuelling sequence adopted is that D1, D2 of refuelling, one after the other, the two aircraft in a single pass to the refuelling hose.

When the maximum distance L2 that the second aircraft can fly while waiting to be refuelled is less than DMIN, the refuelling sequence is impossible without jeopardizing the endurance of the second aircraft. The sequence must be abandoned or at the very least the refuelling order of the two aircraft in the squadron reversed. The case corresponds to case 32 indicated by 0.

When the maximum distance L2 that the second aircraft can fly is between DMIN and D1, to comply with the endurance of the second aircraft means dividing the refuelling of the first aircraft into two passes, namely a first pass D11 to the refuelling hose, greater than DMIN but less that L2, and a second pass to the refuelling hose D12 for the balance, coming after the refuelling D2 of the second aircraft. The situation corresponds to case 33. In this situation, the refuelling sequence adopted is that D11, D2, D12 of a refuelling operation composed of a waiting first pass D11 by the first aircraft to the refuelling hose, followed by a single pass D2 by the second aircraft to the refuelling hose, during which the latter receives the entire amount of fuel demanded, and the second pass D12 for the balance, by the first aircraft during which the latter receives the balance of the fuel to which it had not the right during its first pass.

Three-Aircraft Squadron Case

As indicated above, two verifications have already been made, that for the existence of an endurance problem revealed by the fact that at least one of the conditions D1<L2 and D1+D2<L3 is not met and that of the possibility of solving this endurance problem revealed by the fact that the conditions DMIN<L2 and 2DMIN<L3 are met.

The endurance problem may relate either to the second aircraft, or to the third aircraft, or to both the second and third aircraft in the squadron. This therefore has to be specified.

The procedure starts by verifying if the endurance problem relates to only the second aircraft in the squadron, by again observing the way in which the conditions D1<L2 and D1+D2<L3 are met.

The condition D1<L2 may be the only one not to be met. The endurance problem relates only to the aircraft placed in the second position in the queue. Since the condition DMIN<L2 is assumed to be met, the refuelling of the first aircraft into two passes solves the endurance problem of the second aircraft. The refuelling of the first aircraft is then divided into two passes:

$D1=D11+D12$ with $D11=DMIN.$

If the condition DMIN<L2 was not satisfied, there would be no viable solution and no refuelling sequence would be proposed.

The condition D1+D2<L3 may be the only one not to be met. The endurance problem relates only to the aircraft placed in third position in the queue. Since the condition 2DMIN<L3 is assumed to be met, this endurance problem can be solved by the refuelling of one or more of the aircraft placed ahead in the queue being divided into two passes. It is first sought to discover whether dividing the refuelling of the second aircraft into two passes could suffice in order to solve the endurance problem of the third aircraft by checking whether the condition D1+DMIN<L3 is met.

If the condition D1+DMIN<L3 is met, dividing the refuelling of the second aircraft into two passes solves the endurance problem of the third aircraft. The refuelling of the second aircraft is then divided into two passes:

$D2=D21+D22$ with $D21=DMIN.$

If the condition D1+DMIN<L3 is not met, the refuelling of the second aircraft divided into two passes is insufficient to solve the endurance problem of the third aircraft. It is then endeavored to know whether dividing the refuelling of the first aircraft into two passes would solve this endurance problem, by verifying if the condition DMIN+D2<L3 is fulfilled.

If the condition DMIN+D2<L3 is fulfilled, dividing the refuelling of the first aircraft into two passes solves the endurance problem of the third aircraft. The refuelling of the first aircraft is then divided into two passes:

$D1=D11+D12$ with $D11=DMIN.$

If the condition DMIN+D2<L3 is not fulfilled, dividing the refuelling of the second or the first aircraft into two passes will not solve the endurance problem of the third aircraft. The refuelling of both the first and second aircraft then has to be divided into two passes, $D1=D11+D12$ $D2=D21+D22$ with $D11=DMIN$ $D21=DMIN.$ If the condition 2DMIN<L3 is not fulfilled, there would be no viable solution and no refuelling sequence would be proposed.

The conditions D1<L2 and D1+D2<L3 cannot be simultaneously fulfilled, showing that endurance problems affect both the two aircraft placed in second and third positions in the refuelling queue. Since the conditions DMIN<L2 and 2DMIN<L3 are assumed to be fulfilled, dividing the refuelling of the first and second aircraft into two passes solves the endurance problems of the second and third aircraft in the squadron:

$D1=D11+D12$ $D2=D21+D22$ with $D11=DMIN$ $D21=DMIN.$

When a dividing solution solving the endurance problems has been found, it is optimized, from the standpoint of the operational capacity of the squadron during refuelling, by extending the durations of the first pass(es) to the refuelling hose to the maximum allowed in compliance with the endurances of the aircraft in the squadron.

When only the refuelling of the second aircraft in the refuelling queue formed by the squadron is divided, the first pass D21 by the second aircraft in the squadron to the refuelling hose is extended from DMIN to L3−D1. Thus, the proposed refuelling sequence is then:

$$D1, D21=L3-D1, D3, D22=D2-D21.$$

When only the refuelling of the first aircraft in the refuelling queue formed by the squadron is divided, the first pass D11 by the first aircraft in the squadron to the refuelling hose is extended from DMIN to min(L2, L3−D2). The proposed refuelling sequence then becomes:

$$D11=\min(L2, L3-D2), D2, D3, D12=D1-D11.$$

When the refuelling of both the first and second aircraft in the queue formed by the squadron is divided, the first passes D11 and D21 by the first and second aircraft to the refuelling hose are extended by successive increments, from the value DMIN to a limiting value allowing the conditions D11<L2 and D11+D21<L3 to be met again. The proposed refuelling sequence then becomes:

$$D11=DMIN+K, D21=DMIN+K, D3, D12=D1-D11, D22=D2-D21,$$

K being the maximum increase in the distance DMIN for meeting the conditions:

$$D11<L2 \text{ and } D11+D21<L3.$$

Figure 6:
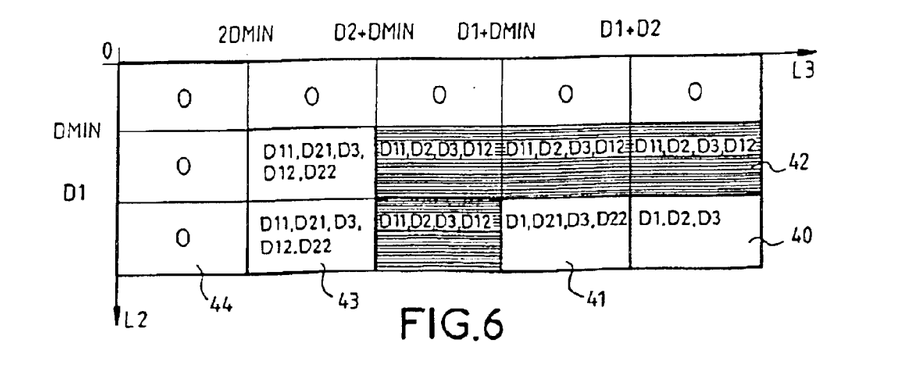
FIG. 6 is a table summarizing the various refuelling sequences proposed according to the various endurance problems that may arise within the context of a squadron of three aircraft.

FIG. 6 is a table summarizing, in the case of a refuelling operation for a three-aircraft squadron, all of the solutions and absence of solutions by dividing the refuelling, making a refuelling sequence viable with a minimum number of passes to the refuelling hose. This table is in two dimensions, one having as variable the endurance L2 of the second aircraft in the refuelling queue and the other the endurance L3 of the third aircraft in the refuelling queue. It is drawn up according to the values of the endurances L2 and L3 of the aircraft in the squadron queuing in the second and third positions in the refuelling queue, these being compared with the values of the amounts of fuel D1, D2, D3 demanded by the three aircraft in the squadron and assumed to be decreasing values, and of the minimum amount DMIN of fuel that can be transferred during a pass to the refuelling hose, the various variables being expressed in terms of distance flown by the tanker.

The table in FIG. 6 shows that the same dividing solution may be suitable for various values of the endurances of the aircraft in the squadron that are placed in second and third positions in the queue.

There are two cases that constitute a particular solution.

The first case, indicated by 40, corresponds to the absence of any division of the refuelling, the aircraft placed in second position in the refuelling queue being able to wait to the end of the refuelling of the first aircraft, since the condition D1<L2 is met, and the aircraft placed at the end of the queue being able to wait for the first two aircraft to be refuelled, the condition D1+D2<L3 being met.

The second case, indicated by 41, corresponds to only the refuelling of the aircraft placed in second position in the queue being divided, the latter not having an endurance problem and the condition D1<L2 being met, but the aircraft placed in third position in the queue having an endurance problem, its endurance L3 lying within the range D1+DMIN<L3<D1+D2.

The other cases are split into three categories, indicated by 42, 43, 44.

The category 42 corresponds to only the refuelling of the first aircraft in the queue being divided, this being justified either in the case of an endurance problem as regards only the aircraft placed in second position in the queue, such that the endurance L2 of this second aircraft lies in the range DMIN<L2<D1, or in the case of an endurance problem as regards only the aircraft placed in third position in the queue, such that the endurance L3 of this third aircraft lies in the range D2+DMIN<L3<D1+DMIN, or again in the case of endurance problems with the aircraft placed in second and third positions in the queue, such that their endurances L2 and L3 lie in the ranges DMIN<L2<D1 and D2+DMIN<L3<D1+D2.

The category 43 corresponds to the refuelling of both the aircraft placed in first and second positions in the queue being divided, when the aircraft placed in third position in the queue has an endurance problem such that its endurance L3 lies in the range 2DMIN<L3<D2+DMIN, while the aircraft placed in second position in the queue may or may not have an endurance problem.

The category 44 corresponds to all unsolvable cases, at least one of the aircraft placed in second or in third position in the refuelling queue not being able to wait the minimum duration DMIN of a first refuelling pass by the first aircraft.

Grouping the dividing solutions into categories as the table in FIG. 6 shows, makes it possible to use an accelerated method of searching for a solution, with or without division, to the refuelling of a three-aircraft squadron, making it possible to solve any endurance problems with the minimum number of passes to the refuelling hose. This accelerated search method is derived from the general method described above and makes use of a technique for selecting the most suitable solution by successive eliminations.

This accelerated search starts with the test of the first particular case 40 in which a division is unnecessary. This case 40 with no division of the refuelling, already envisaged at the start of the general method described above, is adopted and the search is stopped when the aircraft placed in second and third positions in the refuelling queue are able to wait their turn, that is to say when the conditions D1<L2 and D1+D2<L3 are fulfilled. Otherwise, this case is rejected and the search continued.

When the case 40 with no division of the refuelling has been rejected as a consequence of endurance problems, since at least one of the conditions D1<L2 or D1+D2<L3 is not satisfied, a check is made whether the endurance problem or problems can be solved by dividing the refuelling into two passes. This check is made by seeing whether the conditions DMIN<L2 and 2DMIN<L3 are satisfied.

If one of the conditions DMIN<L2 or 2DMIN<L3 is not satisfied, dividing the refuelling will not solve the endurance problems. The situation is that of category 44 and one can but signal an impossibility of refuelling.

If both the conditions DMIN<L2 and 2DMIN<L3 are satisfied, the search continues by examining the second particular case 41 corresponding to only the refuelling of the aircraft placed in second position in the queue being divided. This second particular case 41 is adopted and the search stopped should the conditions D1<L2 and D1+DMIN<L3 be simultaneously met. If not, this case is rejected in turn and the search is continued.

When both particular cases 40 and 41 have been eliminated, the category 42, corresponding to the various cases in which the lack of endurance requires only the refuelling of the aircraft placed in first position in the queue being divided, is envisaged. Having eliminated the two particular cases 40 and 41, the only condition to be met for selecting this category 42 is the condition D2+DMIN<L3. If this condition is met, the category 42 corresponding to only the refuelling of the second aircraft in the queue being divided is adopted and the search is stopped. Otherwise, the category 42 is rejected in turn and the search continued.

When the two particular cases 40 and 41 and the category 42 have been eliminated, the category 43 corresponding to the various cases of lack of endurance that can be solved by dividing the refuelling of the first and second aircraft in the queue, which is the only case remaining, is adopted and the search stopped.

As previously, when one or both refuelling divisions have been adopted (particular case 41 and categories 42 and 43), the durations of the first passes to the refuelling hose are maximized, which means that, as regards the particular case 41 of only the refuelling of the aircraft placed in second position in the queue being divided, the first pass D21 is extended from DMIN to L3−D1, as regards the category 42, corresponding to only the refuelling of the aircraft placed in first position in the queue being divided, the first pass D11 is extended from DMIN to min(L2, L3−D2) and, as regards the category 43, corresponding to the refuelling of both the aircraft placed in first and second positions in the queue being divided, the durations of the first passes D11 and D21 are extended from DMIN to the maximum value allowing the endurance conditions; namely D11<L2 and D11+D21<L3, to be met.

Four-Aircraft Squadron Case

The general method of searching for a refuelling sequence satisfying the endurances of the aircraft in the squadron and minimizing the number of passes to the refuelling hose that was described above, the application of which to a three-aircraft squadron has just been explained, extends without any difficulty to a four-aircraft squadron. It results in a set of solutions and of absences of solutions, which may be summarized in a table in three dimensions, a first dimension according to the endurance L2 of the second aircraft in the refuelling queue, a second dimension according to the endurance L3 of the third aircraft in the refuelling queue and a third dimension according to the endurance L4 of the fourth aircraft in the refuelling queue. This three-dimensional table can be given as a plane representation by projecting it along one of its axes. This is illustrated in FIGS. 7a and 7b which result from a projection with respect to the axis of its first dimension L2 and which are dedicated to the cases in which the aircraft to be refuelled are placed in a refuelling queue order corresponding to decreasing amounts of fuel demanded.

Figure 7A:
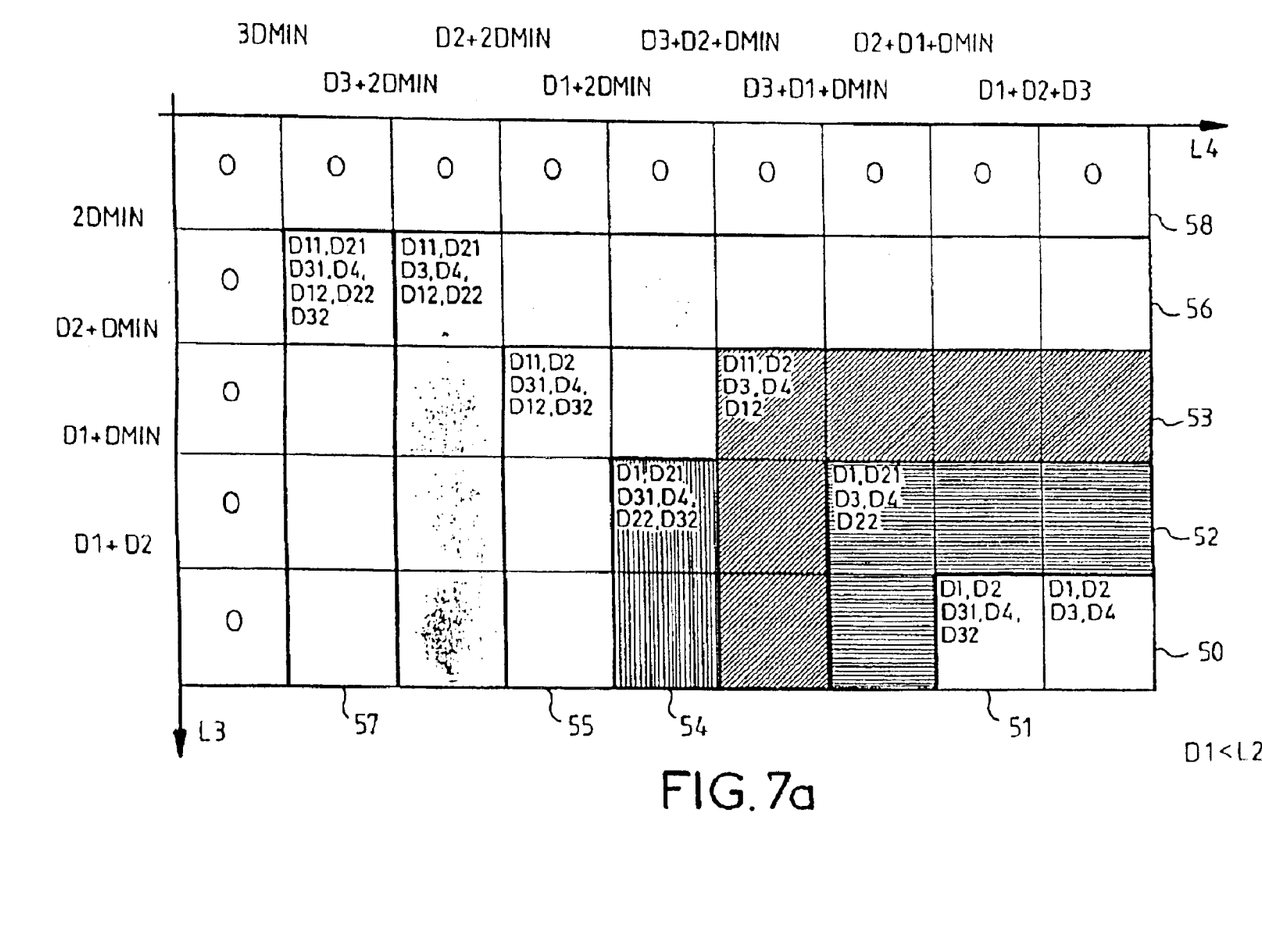
FIGS. 7a and 7b are tables summarizing the various refuelling sequences proposed according to the various endurance problems that may arise within the context of a squadron of four aircraft.
Figure 7B:
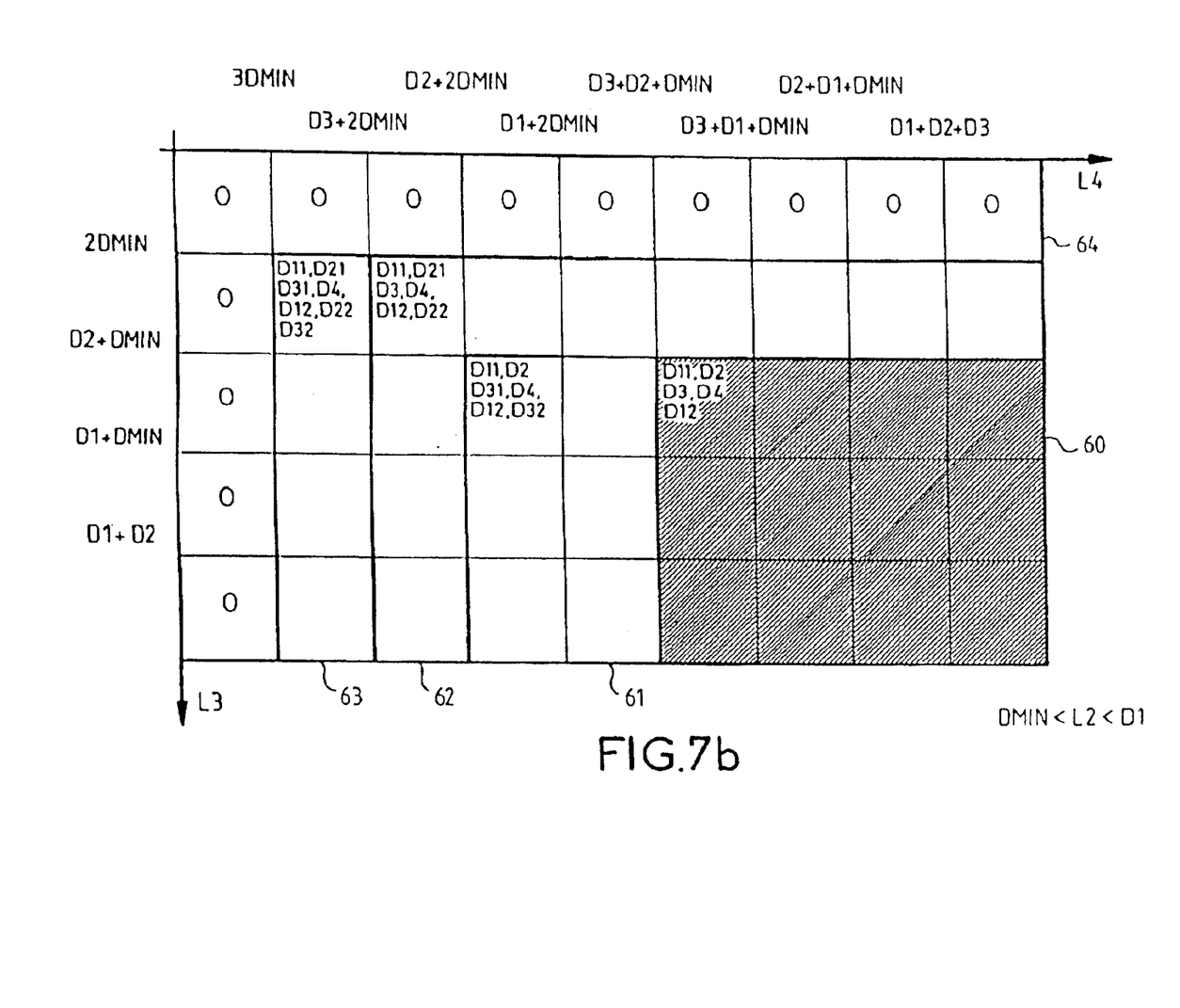

More specifically, the plane table in FIG. 7a brings together the solutions suitable for the situations in which the aircraft placed in second position in the refuelling queue does not have an endurance problem, since the condition D1<L2 is met, while the plane table in FIG. 7b brings together the solutions suitable for the situations in which the aircraft placed in second position in the refuelling queue does have an endurance problem that can be solved by dividing the refuelling of the first aircraft in the queue, since the conditions DMIN<L2<D1 are met. Strictly speaking, other situations may arise but they all correspond to the assumption that the second aircraft in the refuelling queue has an endurance problem such that it cannot wait until the end of a first pass to the refuelling hose by the first aircraft in the queue. There is therefore no solution, which is represented by a plane table containing only the single category of unsolvable cases, and to represent this would provide no particular information.

As previously for the table in FIG. 6, the tables in FIGS. 7a and 7b show that the same dividing solution may be suitable for various endurance values of the aircraft in the squadron that are placed in second, third and fourth positions in the queue.

Only two cases constitute a particular solution.

The first case, indicated by 50 in FIG. 7a, corresponds to the absence of any refuelling division, the aircraft placed in second position in the refuelling queue being able to wait for the end of refuelling of the first aircraft, since the condition D1<L2 is met for the entire table in FIG. 7a, the aircraft placed in third position in the queue being able to wait for the end of refuelling of the first and second aircraft, since the condition D1+D2<L3 is met, and the aircraft placed at the end of the queue being able to wait for the refuelling of the first three aircraft, the condition D1+D2+D3<L4 being met.

The second case, indicated by 51 in FIG. 7a, corresponds to only the refuelling of the aircraft placed in third position in the queue being divided, neither this plane, nor those that precede it in the queue, having an endurance problem, the condition D1<L2 being met for the entire table in FIG. 7a and the condition D1+D2<L3 also being met in this case, but the aircraft placed in fourth position in the queue having an endurance problem, its endurance L4 lying within the range D1+D2+DMIN<L3<D1+D2+D3.

The other cases are split into various categories, indicated by 52, 53, 54, 55, 56, 57, 58, 60, 61, 62, 63, 64, and appear either in FIG. 7a or in FIG. 7b.

Starting with FIG. 7a, which corresponds to the refuelling situations in which the aircraft in the second position in the queue has never had an endurance problem, since the condition D1<L2 is always met, the following categories may be listed:

a category 52 corresponding to only the refuelling of the second aircraft in the queue being divided, this being justified either in the case of an endurance problem as regards only the aircraft placed in fourth position in the queue, such that the endurance L4 of this fourth aircraft lies within the range D3+D1+DMIN<L4<D2+D1+DMIN, or in the case of an endurance problem as regards only the aircraft placed in third position in the queue, such that the endurance L3 of this third aircraft lies in the range D1+DMIN<L3<D1+D2, or else, if the aircraft placed in third and fourth positions in the queue have endurance problems, such that their endurances L3 and L4 lie within the ranges D1+DMIN<L3<D1+D2 and D3+D1+DMIN<L4<D1+D2+D3;

a category 53 corresponding to only the refuelling of the first aircraft in the queue being divided, which is justified either in the case of an endurance problem as regards just the aircraft placed in fourth position in the queue, such that the endurance L4 of this fourth aircraft lies within the range D3+D2+DMIN<L4<D3+D1+DMIN, or in the case of an endurance problem as regards only the aircraft placed in third position in the queue, such that the endurance L3 of this third aircraft lies within the range D2+DMIN<L3<D1+DMIN, or else should the aircraft placed in third and fourth positions in the queue have endurance problems, such that their endurances L3 and L4 lie within the ranges D2+DMIN<. L3<D1+D2 and D3+D2+DMIN<L4<D3+D1+DMIN or within the ranges D2+DMIN<L3<D1+DMIN and D3+D2+DMIN<L4<D1+D2+D3;

a category 54 corresponding to both the refuelling of the aircraft placed in second and third positions in the queue being divided, when the aircraft placed in fourth position in the queue has an endurance problem, such that its endurance L4 lies within the range D1+2DMIN<L4<D3+D2+DMIN, the aircraft placed in third position in the queue has an endurance L3 remaining greater than D1+DMIN and the aircraft placed in second position in the queue does not have an endurance problem;

a category 55 corresponding to both the refuelling of the aircraft placed in first and third positions in the queue being divided, either in the case of an endurance problem as regards only the aircraft placed in fourth position in the queue, such that its endurance L4 lies within the range D2+2DMIN<L4<D1+2DMIN, or should the aircraft placed in third and fourth positions in the queue have endurance problems such that their endurances L3 and L4 lie within the ranges D2+2DMIN<L4<D1+2DMIN and D2+DMIN<L3<D1+D2 or within the ranges D2+2DMIN<L4<D3+D2+DMIN and D2+DMIN<L3'D1+DMIN;

a category 56 corresponding to the refuelling of the first and second aircraft in the queue being divided, which is justified either in the case of an endurance problem as regards only the aircraft placed in fourth position in the queue, such that the endurance L4 of this fourth aircraft lies within the range D3+2DMIN<L4<D2+2DMIN, or an endurance problem as regards only the aircraft placed in third position in the queue, such that the endurance L3 of this third aircraft lies within the range 2DMIN<L3<D2+DMIN, or else should the aircraft placed in third and fourth positions in the queue have endurance problems such that their endurances L3 and L4 lie within the ranges 2DMIN<L3<D1+D2 and D3+2DMIN<L4<D2+2DMIN or within the ranges 2DMIN<L3<D2+DMIN and D3+2DMIN<L4<D1+D2+D3;

a category 57 corresponding to the refuelling of the first, second and third aircraft in the queue being divided when the aircraft placed in fourth position in the refuelling queue has an endurance problem, such that its endurance L4 lies within the range 3DMIN<L4<D3+2DMIN; and a category 58 corresponding to unsolvable cases, at least one of the aircraft placed in third or fourth position, in the refuelling queue being unable to wait for the time for the first refuelling passes by the aircraft that precede it in the queue.

Continuing with FIG. 7b, which corresponds to refuelling situations in which the aircraft in second position in the queue has an endurance problem that can be solved by dividing the refuelling of the first aircraft in the queue, the following categories may again be listed:

a category 60 which corresponds to only dividing the refuelling of the aircraft in the first position in the queue, either in the case of an endurance problem as regards only the aircraft placed in second position in the queue which, for all situations in the table in FIG. 7b, has an endurance L2 lying within the range DMIN<L2<D1, or in the case of two endurance problems, that of the aircraft placed in second position in the queue, whose endurance L2 lies within the range DMIN<L2<D1 and that of the aircraft placed in third position in the queue, when its endurance L3 lies within the range D2+DMIN<L3<D1+D2, or that of the aircraft placed in second position in the queue, whose endurance L2 lies within the range DMIN<L2<D1 and that of the aircraft placed in fourth position in the queue when its range L4 lies within the range D3+D2+DMIN<L4<D1+D2+D3, or else in the case of three endurance problems, that of the aircraft placed in second position in the queue, whose endurance L2 lies within the range DMIN<L2<D1, that of the aircraft placed in third position in the queue when its endurance L3 lies within the range D2+DMIN<L3<D1+D2 and that of the aircraft placed in fourth position in the queue when its endurance L4 lies within the range D3+D2+DMIN<L4<D1+D2+D3;

a category 61 which corresponds to the refuelling of the aircraft based in first and third positions in the queue being divided in the case of two or three endurance problems arising with the aircraft placed in second position in the queue, the endurance L2 of which lies within the range DMIN<L2<D1, the aircraft placed in fourth position in the queue when its endurance L4 lies within the range D2+2DMIN<L4<D3+D2+DMIN and possibly the aircraft placed in third position in the queue, provided that its endurance L3 remains greater than D2+DMIN;

a category 62 which corresponds to the refuelling of the aircraft placed in first and second positions in the queue being divided, either in the case of two endurance problems, that of the aircraft placed in second position in the queue, the endurance L2 of which lies within the range DMIN<L2<D1 and that of the aircraft placed in third position in the queue when its endurance L3 lies within the range 2DMIN<L3<D2+DMIN, or that of the aircraft placed in fourth position in the queue when its endurance L4 lies within the range D3+2DMIN<L4<D2+2DMIN, or in the case of three endurance problems, that of the aircraft placed in second position in the queue, the endurance L2 of which lies within the range DMIN<L2<D1, and those of the aircraft placed in third and fourth position in the queue, the endurances L3 and L4 of which lie within the ranges 2DMIN<L3<D1+D2 and D3+2DMIN<L4<D2+2DMIN or 2DMIN<L3<D2+DMIN and D3+2DMIN<L4<D1+D2+D3;

a category 63 which corresponds to the refuelling of the aircraft placed in first, second and third position in the queue being divided either in the case of two endurance problems, that of the aircraft placed in second position in the queue, the endurance L2 of which lies within the range DMIN<L2<D1 and that of the aircraft placed in fourth position in the queue, the endurance of which lies within the range 3DMIN<L4<D3+2DMIN, the aircraft placed in third position in the queue not having an endurance problem, its endurance L3 meeting the condition D1+D2<L3, or in the case of three endurance problems, that of the aircraft placed in second position in the queue, the endurance L2 of which lies within the range DMIN<L2<D1, that of the aircraft placed in third position in the queue, the endurance L3 of which lies within the range 2DMIN<L3<D1+D2 and that of the aircraft placed in fourth position in the queue, the endurance L4 of which lies within the range 3DMIN<L4<D3+2DMIN; and a category 64 which corresponds to unsolvable cases, at least one of the aircraft placed in third or in fourth position in the refuelling queue being unable to wait for the duration of the first refuelling passes by the aircraft that precede them in the queue.

As previously, in the case of a squadron composed of three aircraft, grouping the dividing solutions shown in the tables in FIGS. 7a and 7b into categories makes it possible to use an accelerated method of searching for the solution, with or without dividing, for refuelling a four-aircraft squadron making it possible to solve any endurance problems with the minimum number of passes to the refuelling hose. This accelerated search method is derived from the general method described above and makes use of a technique for selecting the most suitable solution by successive eliminations.

This accelerated search starts with the test of the viability of the particular case 50 of no refuelling division, envisaged at the start of the general method described above. The absence of refuelling division is adopted and the search stopped when the aircraft placed in second, third and fourth positions in the refuelling queue are able to wait their turn, that is to say when the conditions D1<L2, D1+D2<L3 and D1+D2+D3<L4 are fulfilled. Otherwise, the particular case 50 is rejected and the search is continued.

When the case 50 of no refuelling division is not appropriate, this is because one or more endurance problems arise. A search is then made to see if these endurance problems can be solved by dividing the refuelling of the aircraft placed ahead in the queue, by envisaging the categories 58 and 64 which correspond to impossible situations. A situation falls within these categories 58 and 64 of impossibility when one of the conditions DMIN<L2 or 2DMIN<L3 or 3DMIN<L4 is not met. If one of these conditions is not fulfilled, the search is stopped as it is doomed to failure.

If these conditions are met, the endurance problem(s) leading to the elimination of the particular case 50 can be solved by dividing one or more refuelling operations. The search then continues in order to find the refuelling division (s) resulting in the minimum number of passes to the refuelling hose, while still avoiding the endurance problems.

The case 51, in which only the refuelling of the aircraft placed in third position in the queue is divided, is then envisaged. This is adopted and the search stopped should the conditions D1<L2, D1+D2<L3 and D1+D2+DMIN<L4 be simultaneously met. Otherwise, it is rejected in turn, and the search is continued.

When both particular cases 50 and 51 have been eliminated, the category 52 corresponding to the various cases in which the lack of endurance can be solved by only the refuelling of the aircraft placed in second position in the queue being divided is envisaged. Since the two particular cases 50 and 51 have been eliminated beforehand, the only conditions to be met for selecting this category 52 are the conditions D1<L2, D1+DMIN<L3 and D1+D3+DMIN<L4. If these conditions are all met, the dividing of only the refuelling of the second aircraft in the queue is adopted and the search stopped. Otherwise, the category 52 is rejected in turn and the search continued.

When the category 52 has been eliminated, the categories 53 and 60 corresponding to the various cases of the lack of endurance being able to be solved by only the refuelling of the aircraft placed at the front of the queue being divided are envisaged. Since the two particular cases 50 and 51 and the category 52 have been eliminated beforehand, the only conditions to be met for selecting these categories are the conditions D2+DMIN<L3 and D3+D2+DMIN<L4. If these conditions are met, the situation of the refuelling of only the aircraft placed at the front of the queue being divided is adopted and the search stopped. Otherwise, the categories 53 and 60 are rejected in turn, and the search continued.

When the categories 53 and 60 have been eliminated, the category 54 corresponding to the various cases of lack of endurance that can be solved by dividing only the aircraft placed in the second and third positions in the queue is envisaged. Since the two particular cases and the category 52 have been eliminated beforehand, the only conditions to be met for selecting this category are the conditions D1<L2, D1+DMIN<L3 and D1+2DMIN<L4. If these conditions are all met, the situation in which the refuelling of only the aircraft placed in second and third positions in the queue are divided is adopted and the search stopped. Otherwise, the category 54 is rejected in turn, and the search continued.

When the category 54 has been eliminated, the categories 55 and 61 corresponding to the various cases of a lack of endurance that can be solved by the refuelling of only the aircraft placed in first and third positions in the queue being divided are envisaged. Since the two particular cases 50, 51 and the categories 52, 53, 54 and 60 have been eliminated beforehand, the only conditions to be met for selecting these categories are the conditions D2+DMIN<L3 and D2+2DMIN<L4. If these conditions are met, the situations in which the refuelling of only the aircraft placed in first and third positions in the queue are divided are adopted, and the search stopped. Otherwise, the categories 55 and 61 are rejected in turn, and the search continued.

When the categories 55 and 61 have been eliminated, the categories 56 and 62 corresponding to the various cases of lack of endurance that can be solved by the refuelling of only the aircraft placed in first and second positions in the queue being divided are envisaged. Since the two particular cases 50, 51 and the categories 52, 53, 54, 55, 60 and 61 have been eliminated beforehand, the only condition to be met for selecting these categories is the condition D3+2DMIN<L4. If this condition is met, the situation in which the refuelling of only the aircraft placed in first and second positions in the queue are divided is adopted, and the search stopped. Otherwise, the categories 56 and 62 are rejected in turn, and the search continued.

When the categories 56 and 62 have been eliminated as they are not appropriate, there remain only the categories 57 and 63 corresponding to the refuelling of the aircraft placed in the first, second and third positions in the queue being divided. These divided refuelling situations are adopted since it has been confirmed at the start of the search that the endurance problems could be solved and that dividing the refuelling of all the aircraft other than the one placed at the back of the queue constitutes the final solution.

As previously, when one or more divided refuelling situations have been adopted, the durations of the first passes to the refuelling hose are maximized, taking measures to ensure that the endurances of the aircraft are complied with.

Thus, in the case of only the refuelling of the aircraft placed in third position in the queue being divided, the first pass D31 to the refuelling hose by the aircraft in third position in the queue is extended from DMIN to L4−D1−D2. In the case of the refuelling of only [lacuna] placed in second position in the queue being divided, the first pass D21 to the refuelling hose by the aircraft in second position in the queue is extended from DMIN to min(L3−D1, L4−D1−D2). In the case in which only the refuelling [lacuna] placed in first position in the queue is divided, the first pass D11 to the refuelling hose by the aircraft in first position in the queue is extended from DMIN to min(L2, L3−D2, L4−D2−D3).

Likewise, in the case in which the refuelling of both the aircraft placed in third and second positions in the queue is divided, the first passes D31 and D21 to the refuelling hose by these two aircraft are extended from DMIN to a value DMAX such that the conditions D1+2DMAX<L4 and D1+DMAX<L3. In the case in which the refuelling of both aircraft placed in the third and first positions in the queue is divided, the first passes D31 and D11 to the refuelling hose by these two aircraft are extended from DMIN to a value DMAX such that the conditions D2+2DMAX<L4, DMAX+ D2<L3 and DMAX<L2. In the case in which the refuelling of both aircraft placed in the second and first positions in the queue is divided, the first passes D21 and D11 to the refuelling hose by these two aircraft are extended from DMIN to a value DMAX such that the conditions D3+2DMAX<L4, 2DMAX<L3 and DMAX<L2.

Likewise, in the case in which the refuelling of the three aircraft placed in first, second and third positions in the queue is divided, their first passes D31, D21 and D11 to the refuelling hose are extended from DMIN to a value DMAX such that the conditions 3DMAX<L4, 2DMAX<L3 and DMAX<L2.

When the refuelling of several aircraft is divided, a search for the maximum common value for their first passes DMAX may be carried out iteratively, starting from the value DMIN and repeatedly adding to it an increment INC until reaching a situation in which one of the conditions imposed by the endurances of the aircraft is not met.

The method of managing in-flight refuelling that has just been described can be easily extended to the refuelling of a squadron composed of more than four aircraft, the increase in number of aircraft in the squadron merely increasing the number of possible ways of dividing the refuelling operations.

Once the order of refuelling the aircraft in the squadron has been established and the aircraft whose refuelling must be divided have been identified, the refuelling times and distances for the amounts of fuel demanded may be accurately determined. It is therefore possible to estimate the amounts of fuel that the aircraft in the squadron will actually have at the end of the refuelling operation and to adjust the amounts of fuel transferred to the aircraft so that these estimated amounts correspond to the desired amounts. This adjustment, which has an impact both on the refuelling times and distances, may be made iteratively, until a situation is reached in which differences between demands and estimates of the amounts of fuel available are acceptable.

What is claimed is:

1. A method of managing the in flight refuelling of a squadron (1) of n aircraft A1, . . . , An from the same refuelling hose of a tanker (2), making it possible to generate a refuelling sequence on the basis of taking into account a refuelling rendezvous point P, the number n of aircraft in the squadron (1), the amounts of fuel Q1, . . . , Qn demanded by the aircraft A1, . . . , An of the squadron (1) and the maximum distances L1, . . . , Ln that can be covered by each aircraft in the squadron (1) in waiting for the start of refuelling, these maximum distances L1, . . . , Ln corresponding to the distances separating the refuelling rendezvous point P, over the route followed by the tanker (2), from the limiting points that can be reached by the various aircraft in the squadron (1) without refuelling and without them drawing on their fuel reserves, said comprising the steps of:

initially taking an arbitrary refuelling sequence defined by the queuing of the aircraft in the squadron (1) in an arbitrary order A1, . . . , An and a single pass by each aircraft in the squadron (1) to the refuelling hose;

testing the viability of the refuelling sequence adopted, consisting in expressing, as distances D1, . . . , Dn to be flown by the tanker (2), the times needed to deliver to the aircraft in the squadron (1) the planned amounts of fuel during their passes to the refuelling hose and in verifying, by going down the queue, that each aircraft other than the one at the front of the queue A2, . . . , An will start its refuelling within the deadlines, that is to say before the tanker (2) has flown a distance greater than the maximum distance L2, . . . , Ln that can be covered by the aircraft in question;

when there is no finding that an aircraft will start its refuelling beyond the deadline, accepting the viability of the refuelling sequence tested and of adopting it;

when there is a finding that an aircraft will start its refuelling beyond the deadline, modifying the refuelling sequence tested in order to shorten the waiting time by this aircraft and of trying to fuel it within the deadlines, the modification in the sequence consisting in dividing, into two passes, the refuelling operation or operations of one or more aircraft that precede the aircraft in question in the queue, a first shortened pass to the refuelling hose allowing an aircraft to receive a minimum amount of fuel, increasing its endurance sufficiently for it to be able to move to the end of the queue and to wait for a second pass to the refuelling hose for the remainder of the fuel without drawing on its fuel reserve, the one or more aircraft whose refuelling is divided into two being chosen so as to minimize the number of passes to the refuelling hose, the choice firstly depending on the aircraft, if there is one, that is placed ahead in the queue and the dividing of the refuelling of which into two passes to the refuelling hose makes it possible to approach as best as possible, by an upper value, the desired time saving, and then on the two aircraft, if they exist, placed ahead in the queue, the divisions of the refuelling of which make it possible to approach as best as possible, by an upper value, the desired time saving, and so on, the absence of a solution in the choice of the aircraft for divided refuelling resulting in a finding that it is impossible to refuel the entire squadron, whereas the presence of a solution leads to a modified refuelling sequence proposal; and taking any modified refueling sequence proposal and testing its viability by restarting at the second step of the method.

2. The method of claim 1, comprising an additional step in the case of a negative viability test of the arbitrary refuelling sequence initially adopted, this additional step consisting in replacing said arbitrary refuelling sequence with a refuelling sequence referred to as a nominal refuelling sequence defined by an order in the queue corresponding to decreasing amounts of fuel demanded and by a single pass of each aircraft in the squadron (1) to the refuelling hose, the first aircraft in the queue being that requiring the largest amount of fuel.

3. The method of claim 1, comprising an additional step in the case of a negative viability test of the arbitrary refuelling sequence initially adopted, this additional step consisting in replacing said arbitrary refuelling sequence with a refuelling sequence defined by an order in the queue corresponding to increasing maximum distances L1, L2 . . . , Ln that can be covered and by a single pass by each aircraft in the squadron (1) to the refuelling hose, the aircraft placed at the front of the queue being that having the shortest maximum distance that can be covered.

4. The method of claim 1, in case of a viability test of a refuelling sequence be negative owing to the finding that one aircraft in the squadron (1) will start its refuelling beyond the deadline, the choice of the one or more aircraft, placed ahead in the queue, the refuelling of which is divided, results from systematic virtual tests carried out by going up the queue taking into consideration one aircraft, then two aircraft, including that one giving the greatest time saving, then three aircraft, including the two providing the greatest time saving, and so on.

5. The method of claim 1, wherein the duration of a first shortened pass to the refuelling hose of a divided refuelling operation is set to the same value DMIN for all the aircraft in the squadron (1), which value is progressively increased, once the refuelling sequence has satisfied the viability test, until reaching the endurance limit for one of the aircraft in the squadron (1).

6. The method of claim 1, wherein the choice of the aircraft in the squadron (1) whose refuelling is divided results from checking that a succession of inequality relationships between the flight distances D1, . . . , Dn needed by the tanker (2), in order to deliver the required amounts of fuel during each pass of the aircraft in the squadron (1) to the refuelling hose and the maximum distances L1, L2, . . . , Ln that can be covered by each aircraft in the squadron (1), is met.

7. A method of managing the in-flight refueling of a squadron (1) of n aircraft A1, . . . , An from the same refueling hose of a tanker (2), making it possible to generate a refueling sequence on the basis of taking into account a refueling rendevouz point P, the number n of aircraft in the squadron (1), the amounts of fuel Q1, . . . , Qn demanded by the aircraft A1, . . . , An of the squadron (1) and the maximum distance L1, . . . , Ln that can be covered by each aircraft in the squadron (1) in waiting for the start of refueling, these maximum distance L1, . . . , Ln corresponding to the distances separating the fuel rendezvous point P, over the route followed by the tanker (2), from the limiting points that can be reached by the various aircraft in the squadron (1) without refueling and without them drawing on their fuel reserves, said method being applied to a squadron of two aircraft and comprising the steps of:

accepting an arbitrary order in the queue for the two aircraft in the squadron;

checking whether the maximum distance L2 that can be covered by the aircraft in second position in the refuelling queue is greater than the duration, expressed as a distance D1 that can be covered, necessary for refuelling the aircraft placed in first position in the queue in one pass to the refuelling hose;

if this is the case, since the condition D1<L2 is satisfied, adopting the refuelling sequence D1, D2 with only one pass per aircraft to be refuelled; and if this is not the case, since the condition D1<L2 is not satisfied, checking that the maximum distance L2 that can be covered by the aircraft placed second in the queue is greater than the minimum duration, expressed as the distance DMIN that can be covered, of a pass to the refuelling hose;

if this is not the case, since the condition DMIN<L2 is not satisfied, signaling the impossibility of refuelling with the adopted order in the queue; and if this is the case, since the condition D1<L2 is satisfied, adopting the refuelling sequence D11, D2, D12 with the refuelling of the aircraft at the front of the queue being divided into two passes.

8. The method of claim 7, wherein the first refuelling pass D11 by the aircraft in first position in the queue is taken as equal to the maximum distance L2 that can be covered by the aircraft placed in second position in the queue.

9. A method of managing the in-flight refueling of a squadron (1) of n aircraft A1, . . . , An from the same refueling hose of a tanker (2), making it possible to generate a refueling sequence on the basis of taking into account a refueling rendezvous point P, the number n of aircraft in the squadron (1), the amounts of fuel Q1, . . . , Qn demanded by the aircraft A1, . . . An of the squadron (1) and the maximum distance L1, . . . Ln that can be covered by each aircraft in the squadron (1) in waiting for the start of refueling, these maximum distance L1, . . . , Ln corresponding to the distances separating the fuel rendezvous point P, over the route followed by the tanker (2), from the limiting points that can be reached by the various aircraft in the squadron (1) without refueling and without them drawing on their fuel reserves, said method being applied to a squadron of three aircraft and comprising the steps of:

accepting an order in the refuelling queue for the three aircraft in the squadron corresponding to decreasing amounts of fuel demanded;

checking whether the maximum distances L2 and L3 that can be covered by the aircraft placed in the second and third positions in the queue are greater than the durations D1, D1+D2, expressed as distances that can be covered, of the refuelling in one pass to the refuelling hose of the one or more aircraft that is or are placed ahead in the queue;

if this is the case, since the conditions D1<L2 and D1+D2<L3 are satisfied, adopting the refuelling sequence D1, D2, D3 with only one pass to the refuelling hose per aircraft to be refuelled;

if this is not the case, since at least one of the conditions D1<L2 or D1+D2<L3 is not satisfied, checking that the maximum distances L2, L3 that can be covered by the aircraft not occupying the front of the queue are greater than the minimum durations, expressed as the distance DMIN that can be covered, of a pass to the refuelling hose by each of the aircraft placed ahead in the queue;

if this is not the case, since one of the conditions DMIN<L2 or 2DMIN<L3 is not satisfied, signaling the impossibility of refuelling with the adopted order in the queue;

if this is the case, since both the conditions DMIN<L2 and 2DMIN<L3 are satisfied, searching for the refuelling operation(s) the dividing of which leads to a refuelling sequence making it possible to commence the refuelling of all the aircraft in the squadron before they have flown their maximum distances that can be covered while still having only the minimum number of passes to the refuelling hose;

said search for the refuelling operation(s) to be divided in order to be able to commence the refuelling of the aircraft before they have flown their maximum distances that can be covered comprising the following successive steps:

checking whether the conditions D1<L2 and D1+DMIN<L3 are fulfilled;

if this is the case, adopting the refuelling sequence D1, D21, D3, D22 with only the refuelling of the aircraft placed in second position in the queue being divided into two passes;

if this is not the case, since one of the conditions D1<L2 or D2+DMIN<L3 is not satisfied, checking whether the condition D2+DMIN<L3 is fulfilled;

if the condition D2+DMIN<L3 is fulfilled, adopting the refuelling sequence D11, D2, D3, D12 with only the refuelling of the aircraft at the front of the queue being divided into two passes; and if the condition D2+DMIN<L3 is not fulfilled, adopting the refuelling sequence D11, D21, D3, D12, D22 with the refuelling of the aircraft placed in first and second positions in the queue being divided into two passes.

10. The method of claim 9, wherein upon completing the selection of the refuelling sequence D1, D21, D3, D22 with only the refuelling of the aircraft in second position in the queue being divided into two passes, the duration of the first refuelling pass by the aircraft placed in second position in the queue, expressed as the distance D21, is taken as equal to the maximum distance L3 that can be covered by the aircraft placed at the back of the queue, reduced by the distance D1 necessary for refuelling the aircraft placed at the front of the queue in one pass:

$$D21=L3-D1$$

the duration of the second refuelling pass by the aircraft placed in second position in the queue, expressed as the distance D22, being taken as equal to the duration necessary for the amount of fuel transferred in total to reach the amount demanded:

$$D22=D2-D21.$$

11. The method of claim 9, wherein upon completing the selection of the refuelling sequence D11, D2, D3, D12 with only the refuelling of the aircraft in first position in the queue being divided into two passes, the duration of the first refuelling pass by the aircraft placed in first position in the queue, expressed as the distance D11, is taken as equal to the minimum of the maximum distance L2 that can be covered by the aircraft placed in second position in the queue and of the maximum distance L3 that can be covered by the aircraft placed in third position in the queue, reduced by the distance D2 necessary for refuelling the aircraft placed in second position in the queue in one pass:

$$D11=\min(L2, L3-D2)$$

the duration of the second refuelling pass by the aircraft placed in the first position in the queue, expressed as the distance D12, being taken as equal to the duration necessary for the amount of fuel transferred in total to reach the amount demanded:

$$D12=D1-D11.$$

12. The method of claim 9, wherein upon completing the selection of the refuelling sequence D11, D21, D3, D12, D22 with the refuelling of the aircraft placed in the first and second positions in the queue being divided into two passes, the durations of the first refuelling passes by the aircraft placed in the first and second positions in the queue, expressed as the distances D11, D21, are taken as equal to the duration DMIN increased iteratively by an increment INC until, as a limit, the situation is reached in which the conditions D11<L2 and D11+D21<L3 imposed by the endurances of the aircraft placed in the second and third positions in the queue are met, the durations of the second refuelling passes by the aircraft placed in the first and second positions in the queue, expressed as distances D12, D22 being taken as equal to the durations necessary for the amounts of fuel transferred in total to reach the amounts demanded:

$$D12=D1-D11 \text{ and } D22=D2-D21.$$

13. A method of managing the in-flight refueling of a squadron (1) of n aircraft A1, . . . , An from the same refueling hose of a tanker (2), making it possible to generate a refueling sequence on the basis of taking into account a refueling rendezvous point P, the number n of aircraft in the squadron (1), the amounts of fuel Q1, . . . , Qn demanded by the aircraft A1, . . . , An of the squadron (1) and the maximum distance L1, . . . , Ln that can be covered by each aircraft in the squadron (1) in waiting for the start of refueling, these maximum distance L1, . . . , Ln corresponding to the distances separating the fuel rendezvous point P, over the route followed by the tanker (2), from the limiting points that can be reached by the various aircraft in the squadron (1) without refueling and without them drawing on their fuel reserves, said method being applied to a squadron of four aircraft and comprising the steps of:

accepting an order in the refuelling queue for the four aircraft in the squadron corresponding to decreasing amounts of fuel demanded;

checking whether the maximum distances L2, L3 and L4 that can be covered by the aircraft placed in the second, third and fourth positions in the queue are greater than the durations D1, D1+D2, D1+D2+D3 expressed as distances that can be covered, of the refuelling in one pass to the refuelling hose of the one or more aircraft that is or are placed ahead in the queue;

if this is the case, since the conditions D1<L2, D1+D2<L3 and D1+D2+D3<L4 are satisfied, adopting the refuelling sequence D1, D2, D3, D4 with only one pass per aircraft to be refuelled;

if this is not the case, since at least one of the conditions D1<L2 or D1+D2<L3 or D1+D2+D3<L4 is not satisfied, checking that the maximum distances L2, L3, L4 that can be covered by the aircraft not occupying the front of the queue are greater than the minimum durations, expressed as the distance DMIN that can be covered, of a pass to the refuelling hose by each of the aircraft placed ahead in the queue;

if this is not the case, since one of the conditions DMIN<L2 or 2DMIN<L3 or 3DMIN<L4 is not satisfied, signaling the impossibility of refuelling with the adopted order in the queue;

if this is the case, since the three conditions DMIN<L2, 2DMIN<L3 and 3DMIN are satisfied, searching for the refuelling operation(s) the dividing of which leads to a refuelling sequence making it possible to commence the refuelling of all the aircraft in the squadron before they have flown their maximum distances that can be covered while still having only the minimum number of passes to the refuelling hose; said search for the refuelling operation(s) to be divided in order to be able to commence the refuelling of the aircraft before they have flown their maximum distances that can be covered comprising the following successive steps:

checking whether the conditions D1<L2 and D1+D2<L3 and D1+D2+DMIN<L4 are fulfilled;

if this is the case, adopting the refuelling sequence D1, D2, D31, D4, D32 with only the refuelling of the aircraft placed in third position in the queue being divided into two passes;

if this is not the case, since one of the conditions D1<L2 or D1+D2<L3 or D1+D2+Dmin<L4 is not fulfilled, checking whether the conditions D1<L2, D1+DMIN<L3 and D1+D3+DMIN<L4 are fulfilled;

if this is the case, adopting the refuelling sequence D1, D21, D3, D4, D22 with only the refuelling of the aircraft placed in second position in the queue being divided into two passes;

if this is not the case, since one of the conditions D1<L2 or D1+DMIN<L3 or D1+D3+DMIN<L4 is not fulfilled, checking whether the conditions D2+DMIN<L3 and D2+D3+DMIN<L4 are fulfilled;

if this is the case, adopting the refuelling sequence D11, D2, D3, D12 with only the refuelling of the aircraft placed in first position in the queue being divided into two passes;

if this is not the case, since one of the conditions D2+DMIN<L3 or D2+D3+DMIN<L4 is not fulfilled, checking whether the conditions D1<L2, D1+DMIN<L3 and D1+2DMIN<L4 are fulfilled;

if this is the case, adopting the refuelling sequence D1, D21, D31, D4, D22, D32 with the refuelling of the aircraft placed in second and third positions in the queue being divided into two passes;

if this is not the case, since one of the conditions D1<L2 or D1+DMIN<L3 or D1+2DMIN<L4 is not fulfilled, checking whether the conditions D2+DMIN<L3 and D2+2DMIN<L4 are fulfilled;

if this is the case, adopting the refuelling sequence D11, D2, D31, D4, D12, D32 with the refuelling of the aircraft placed in first and third positions in the queue being divided into two passes;

if this is not the case, since one of the conditions D2+DMIN<L3 or D2+2DMIN<L4 is not fulfilled, checking whether the condition D3+2DMIN<L4 is fulfilled;

if the condition D3+2DMIN<L4 is fulfilled, adopting the refuelling sequence D11, D21, D3, D4, D12, D22 with the refuelling of the aircraft placed in first and second positions in the queue being divided into two passes; and if the condition D3+2DMIN<L4 is not fulfilled, adopting the refuelling sequence D11, D21, D31, D4, D12, D22, D31 with the refuelling of the aircraft placed in first, second and third positions in the queue being divided into two passes.

14. The method claim 13, wherein upon completing the selection of the refuelling sequence D1, D2, D31, D4, D32 with only the refuelling of the aircraft in third position in the queue being divided into two passes, the duration of the first refuelling pass by the aircraft placed in third position in the queue, expressed as the distance D31, is taken as equal to the maximum distance L4 that can be covered by the aircraft placed at the back of the queue, reduced by the distances D1 and D2 necessary for refuelling the aircraft placed in first and second positions in the queue in one pass:

$$D31 = L4 - D1 - D2$$

the duration of the second refuelling pass by the aircraft placed in third position in the queue, expressed as the distance D32, being taken as equal to the duration necessary for the amount of fuel transferred in total to reach the amount demanded:

$$D32 = D3 - D31.$$

15. The method of claim 13, wherein upon completing the selection of the refuelling sequence D1, D21, D3, D4, D22 with only the refuelling of the aircraft in second position in the queue being divided into two passes, the duration of the first refuelling pass by the aircraft placed in second position in the queue, expressed as the distance D21, is taken as equal to the minimum of the maximum distance L4 that can be covered by the aircraft placed at the back of the queue, reduced by the distances D1 and D3 necessary for refuelling the aircraft placed in first and third positions in the queue in one pass, and of the maximum distance L3 that can be covered by the aircraft placed in third position in the queue, reduced by the distance D1 necessary for refuelling the aircraft placed at the front of the queue in one pass:

$$D21 = \min(L3 - D1, L4 - D1 - D3)$$

the duration of the second refuelling pass by the aircraft placed in second position in the queue, expressed as the distance D22, being taken as equal to the duration necessary for the amount of fuel transferred in total to reach the amount demanded:

$$D22 = D2 - D21.$$

16. The method claim 13, wherein upon completing the selection of the refuelling sequence D11, D2, D3, D4, D12 with only the refuelling of the aircraft in first position in the queue being divided into two passes, the duration of the first refuelling pass by the aircraft placed in first position in the queue, expressed as the distance D11, is taken as equal to the minimum of the maximum distance L2 that can be covered by the aircraft placed in second position in the queue, of the maximum distance L4 that can be covered by the aircraft placed at the front of the queue, reduced by the distances D2 and D3 necessary for refuelling the aircraft placed in second and third positions in the queue in one pass, and of the maximum distance L3 that can be covered by the aircraft placed in third position in the queue, reduced by the distance D2 necessary for refuelling the aircraft placed in second position in the queue in one pass:

$$D11 = \min(L2, L3 - D2, L4 - D2 - D3)$$

the duration of the second refuelling pass by the aircraft placed in first position in the queue, expressed as the distance D12, being taken as equal to the duration necessary for the amount of fuel transferred in total to reach the amount demanded:

$$D12 = D1 - D11.$$

17. The method of claim 13, wherein upon completing the selection of the refuelling sequence D1, D21, D31, D4, D22, D32 with the refuelling of the aircraft in second and third positions in the queue being divided into two passes, the durations of the first refuelling passes by the aircraft placed in second and third positions in the queue, expressed as the distances D21, D31, are taken as equal to the duration DMIN increased iteratively by an increment INC until, as a limit, the situation is reached in which the conditions D1+D21<L3 and D1+D21+D31<L4 imposed by the endurances of the aircraft placed in third and fourth positions in the queue are met, the durations of the second refuelling passes by the aircraft placed in second and third positions in the queue, expressed as distances D22, D32, being taken as equal to the durations necessary for the amounts of fuel transferred in total to reach the amounts demanded:

$$D22 = D2 - D21 \text{ and } D32 = D3 - D31.$$

18. The method of claim 13, wherein upon completing the selection of the refuelling sequence D11, D2, D31, D4, D12, D32 with the refuelling of the aircraft placed in first and third positions in the queue being divided into two passes, the durations of the first refuelling passes by the aircraft placed in first and third positions in the queue, expressed as the distances D11, D31, are taken as equal to the duration DMIN increased iteratively by an increment INC until, as a limit, the situation is reached in which the conditions D11<L2, D11+D2<L3 and D11+D2+D31<L4 imposed by the endurances of the aircraft placed in the second, third and fourth positions in the queue are met, the durations of the second refuelling passes by the aircraft placed in first and third positions in the queue, expressed as the distances D12, D32, being taken as equal to the durations necessary for the amounts of fuel transferred in total to reach the amounts demanded:

$$D12=D1-D11 \text{ and } D32=D3-D31.$$

19. The method of claim 13, wherein upon completing the selection of the refuelling sequence D11, D21, D3, D4, D12, D22 with the refuelling of the aircraft placed in first and second positions in the queue being divided into two passes, the durations of the first refuelling passes by the aircraft placed in first and second positions in the queue, expressed as the distances D11, D21, are taken as equal to the duration DMIN increased iteratively by an increment INC until, as a limit, the situation is reached in which the conditions D11<L2, D11+D21<L3 and D11+D21+D3<L4 imposed by the endurances of the aircraft placed in second, third and fourth positions in the queue are met, the durations of the second refuelling passes by the aircraft placed in the first and third positions in the queue, expressed as the distances D12, D32, being taken as equal to the durations necessary for the amounts of fuel transferred in total to reach the amounts demanded:

$$D12=D1-D11 \text{ and } D22=D2-D21.$$

20. The method of claim 13, wherein upon completing the selection of the refuelling sequence D11, D21, D31, D4, D12, D32 with the refuelling of the aircraft placed in the first, second and third positions in the queue being divided into two passes, the durations of the first refuelling passes by the aircraft placed in the first, second and third positions in the queue, expressed as the distances D11, D21, D31, are taken as equal to the duration DMIN increased iteratively by an increment INC until, as a limit, the situation is reached in which the conditions D11<L2, D1+D21<L3 and D11+D21+D31<L4 imposed by the endurances of the aircraft placed in the second, third and fourth positions in the queue are met, the durations of the second refuelling passes by the aircraft placed in the first, second and third positions in the queue, expressed as the distances D12, D22, D32, being taken as equal to the durations necessary for the amounts of fuel transferred in total to reach the amounts demanded:

$$D12=D1-D11, D22=D2-D21 \text{ and } D32=D3-D31.$$

* * * * *